June 15, 1937.  F. F. PARIS  2,083,662
ROTARY PLOW CUTTER FASTENING
Filed Aug. 21, 1936
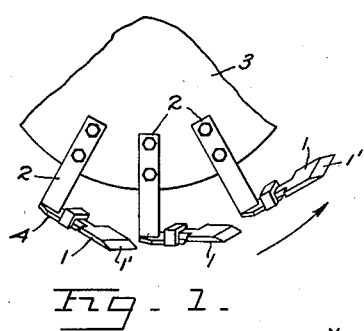
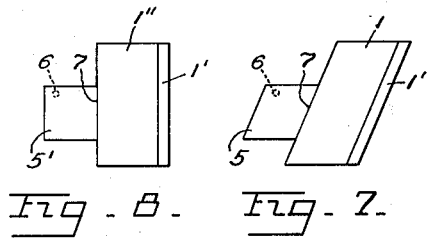
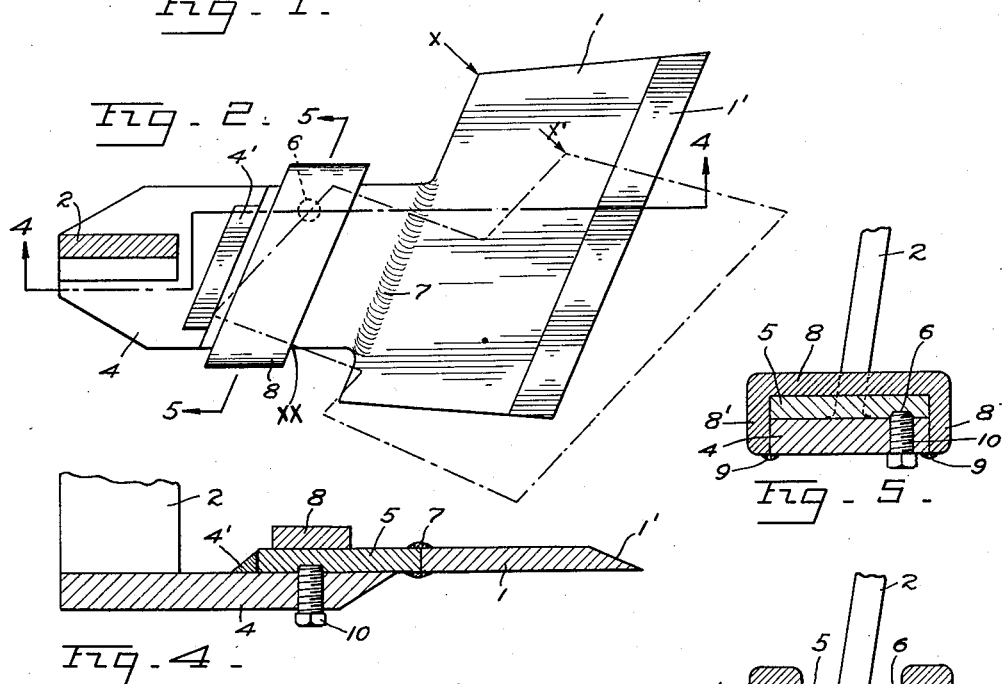
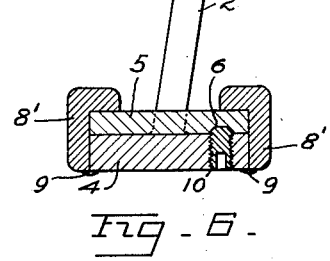
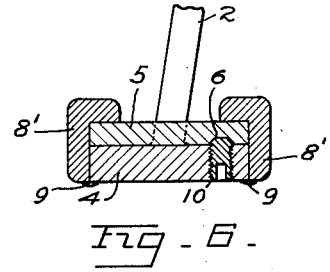
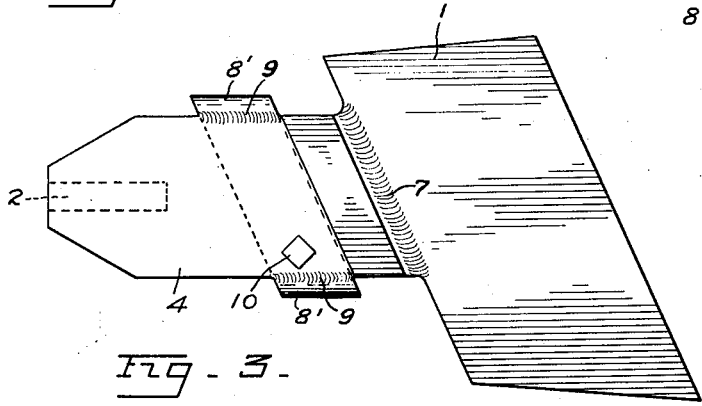
INVENTOR.
FRED F. PARIS
BY Miller Boykene Breed
ATTORNEYS.

Patented June 15, 1937

2,083,662

UNITED STATES PATENT OFFICE 2,083,662

ROTARY PLOW CUTTER FASTENING

Fred F. Paris, Berkeley, Calif.

Application August 21, 1936, Serial No. 97,184

4 Claims. (Cl. 97—212)

This invention relates to rotary plows, earth working or grubbing machines which are provided with a series of earth and root cutting blades cylindrically arranged on drums or spider arms to be revolved in the earth for comminuting the same as the machine is propelled along, such machines as particularly shown in United States Patents Nos. 1,907,332, 1,907,567, 1,816,210 and Re. 19,242 and the principal object of the present invention is to provide improved means for securing the cutting blades to the outer ends of the spider arms or supporting lugs. Other objects and advantages of the invention will appear in the following description and accompanying drawing.

In the drawing, Fig. 1 is an elevation of a portion of a revolvable cylindrical cutter of this type of machine, showing three of its spider arms each with a flat cutter blade secured to its outer end in accordance with my invention.

Fig. 2 is an enlarged plan view of one of the blades and securing lug at the end of the arm and with the arm shown in cross section.

Fig. 3 is a bottom plan view of Fig. 2.

Fig. 4 is a cross section of Fig. 2 taken along the line 4—4 thereof.

Fig. 5 is a cross section of Fig. 2 taken along the line 5—5 thereof.

Fig. 6 is a view similar to that of Fig. 5 but showing a modification.

Fig. 7 is a reduced size plan view of one of the cutter blades.

Fig. 8 is a view similar to that of Fig. 7 but showing a slightly modified form of blade.

The cutter cylinder or wheel of such rotary plows or earth grubbers to which this invention relates is fitted with a large number of cutter blades 1, generally angularly disposed at the ends of supporting arms 2, which extend radially from the revolvable axle or power drum or disks 3 which revolves the cutters in the direction indicated by the arrow in Fig. 1.

The cutters are generally flat steel plates 1, with beveled and sharpened front cutting edges 1' and the arms 2 generally have an enlarged portion or lug 4 at their outer ends to which the cutters are secured and it is the particular manner of doing this and the blade construction involved which constitutes the present invention.

The lugs 4 are generally arranged at an angle, other than a right angle, to the arms 2 so as to tilt the cutter blades out of the horizontal as they pass through the earth being plowed, and they are so shown in the drawing though this is not a feature of the present invention except insofar as the invention offers a simpler effective way of securing such cutter blades in place, and also reduces the amount of cutter steel required as the present construction provides for a reduced width shank on the cutter blade of a cheaper low grade steel in addition to the other advantages.

Fig. 7 shows in plan the preferred form of cutter blade 1 arranged for a slanting cut, while Fig. 8 shows in plan a similar blade 1'' as arranged for a straight or square cut. Both blades are elongated plates of heavy flat steel of high grade to withstand the constant abrasive action to which such blades are subjected in use, and according to my improvement the rear edge of each blade has extending from it a flat plate-like shank as shown respectively at 5 and 5' in Figs. 7 and 8, and which shank is positioned closer to the lower end of the blade proper than to the upper end in these figures to provide an overlapping cut with blades of other rows of cutters not shown. The shanks are also indicated as having a depression on the under side at 6 for a purpose to be later described.

The plate-like shank 5 is preferably of a tough lower carbon steel than the blade proper and is welded to it along the line 7, here shown as in the same plane of the blade proper, though not necessarily so.

The plate-like shank of the blade when in place on the lug 4 lies against the flat upper side of the lug with its rear edge abutting a stop ridge 4' formed on the lug and with a flat steel strap member 8 overlying the shank and provided with bent down ends 8' welded at 9 to lug 4.

Sufficient clearance is provided so that flat shank 5 may be easily slid into place under the strap 8 but no more than necessary, and when in place, a set-screw 10 threaded through the bottom side of lug 4 is tightened up against the lower side of the shank to force it against the strap. Preferably the set screw is provided with a slightly conical end which enters a depression or hole 6 formed in the under side of the shank at the proper point.

Set-screw 10 may be centrally located on the lug, or two may be provided if desired, but I have found that with the angular form of blade and shank shown in Figs. 2 and 7, wherein the shank may be said to be rhomboidal, that one set-screw placed relatively near the right hand margin of the shank (as viewed in Figs. 5 and 6) will lock the shank firmly in place. Also by the construction specified, when the set-screw is released, a slight blow on the upper rear corner of the blade at X (see Fig. 2) will swing the blade around to dotted position X' and thereby will cause the flat shank 5 to swing out of its position by rocking it on the fulcrum point XX thus making the blades very easy to remove for resharpening. The blade may be replaced by a reverse movement.

Instead of the strap 8 extending entirely across the shank 5 as in the preferred form of construction shown in Fig. 5, the central portion may be omitted to leave two short pieces 8' at the edges, as shown in Fig. 6, but this brings up the possibility of one getting knocked off in use. In Fig. 6 is also shown a hollow type set-screw 10' which may be used in any of the showings, though on account of the arc of travel of the cutting edge of the blade through the soil an exposed head set-screw as per Fig. 4 is not exposed to impacts with stones or roots.

Having thus described my invention what I claim is:

1. In a soil working implement of the character described, a cutter supporting arm provided with a lug at its outer end having a flat surface against which the flat shank of a cutter is adapted to seat, a member forming a stop for the extreme end of said shank when in position, and a metal strap extending across the shank integrally connected at its ends to said lug, and a set-screw threaded through the lug in position to impinge against the side of said shank at a point closer to one edge of the shank.

2. In a soil working implement of the character described, a substantially flat steel cutter blade sharpened at its forward edge, a cutter supporting arm provided with a lug at its outer end having a flat surface against which the rear portion of said blade is supported, means extending up from said lug outwardly of the edges of and engaging over the top of said rear portion of the blade, and a set screw threaded through said lug impinging said rear portion of the blade and forcing it outwardly against said means.

3. In a soil working implement of the character described, a substantially flat steel cutter blade sharpened at its forward edge, a cutter supporting arm provided with a lug at its outer end having a flat surface against which the rear portion of said blade is supported, a plurality of means extending up from said lug outwardly of the edges of and engaging over the top of said rear portion of the blade, and a set screw threaded through said lug impinging said rear portion of the blade and forcing it outwardly against said means.

4. In a soil working implement of the character described, a cutter consisting of a substantially flat plate of steel sharpened along one edge and a relatively wide steel shank rigidly secured to and projecting from the rear edge of said plate and with the rear edge of said shank slanted at other than right-angles with its side edges, a supporting standard provided with socket member arranged and adapted to slidably receive the shank therein, and means carried by the socket member removably securing the shank in the socket.

FRED F. PARIS.